Oct. 10, 1950  S. H. M. DODINGTON ET AL  2,524,779
RADIO DISTANCE INDICATOR
Filed Jan. 11, 1947
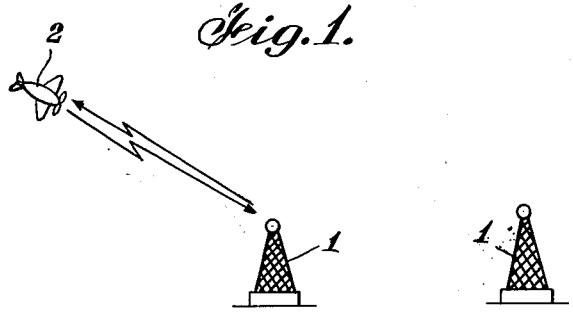
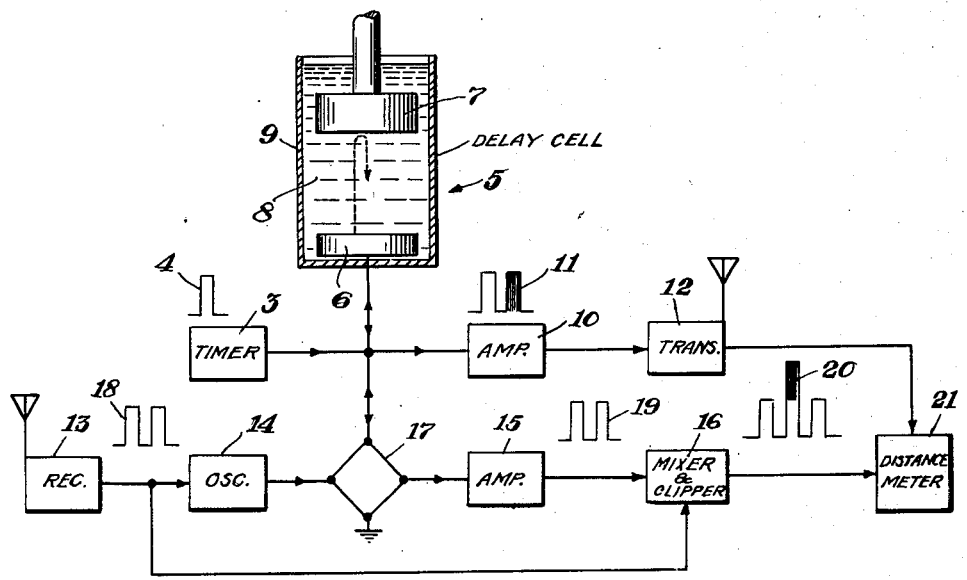
INVENTORS
SVEN H. M. DODINGTON
GILBERT R. CLARK
BY
*R P Morris*
ATTORNEY Patented Oct. 10, 1950

2,524,779

UNITED STATES PATENT OFFICE 2,524,779

RADIO DISTANCE INDICATOR

Sven H. M. Dodington and Gilbert R. Clark, Nutley, N. J., assignors to Federal Telecommunications Labs. Inc., New York, N. Y., a corporation of Delaware Application January 11, 1947, Serial No. 721,536

9 Claims. (Cl. 343—13)

This invention relates to methods and systems for measuring distances and more particularly to electronic systems of the object-detecting type employing high frequency pulses as applied to aircraft.

Methods for measuring distance proposed heretofore of the so-called "Navar" type, in the main, comprise the steps of interrogating a ground beacon by an airplane and the use of the resulting response information from the ground in operating notch-finding and follow-up circuits on the aircraft. Such circuits are, however, exceedingly difficult to operate if requirements for quick hunting, low pulse repetition frequency, and the ability to work through a great deal of interference, are insisted upon.

When considering the essentials of distance measuring systems using notch-finding and follow-up circuits, it is found that such circuits depend for their operation, on the distinctiveness of the airplane's transmitted signal. In practice, this amounts to the picking out of the desired response signal from a welter of interference and other responses based upon the fact that the aircraft knows its own pulse repetition frequency, and that it also knows its distance, and therefore, in theory at least, can set a gate which will open only at such a time when the return signal is expected. The weakness of this method, however, is that it can function only when the position of the airplane is already known, while it is this very distance which it is trying to determine in the first place.

It is an object of the present invention to provide a method and system for measuring distances of an airplane from a given location which does not require the knowledge of such a distance on the part of an airplane.

It is another object to provide a distance measuring system which is capable of recognizing the pulse repetition frequency of its interrogating transmitter.

A further object is to provide a system of the above referred-to type which effectively eliminates outside interference and recognizes its own signal instantaneously.

In accordance with certain features of the invention, we provide a distance measuring system which may be used by aircraft in such a way that the transmitter on the aircraft sends out interrogating pulses toward a beacon at a given repetition rate which is distinct for the airplane. We propose to transmit two pulses for each interrogation separated by a continuously variable distance measured in microseconds. These pulses will be received and retransmitted by the ground beacon and received on the aircraft where they will be compared as to occurrence by means of a delay circuit. Only when they are the right distance apart will operation of the distance indicating meter take place.

These and other features and objects will be more clearly understood and other features and objects may become apparent from the following detailed description of this invention, reference being had to the drawings, in which:

Fig. 1 is a schematic representation of a distance indicating system as applied to aircraft; and Fig. 2 is a diagram, partly in schematic and partly in block form, of a circuit for controlling the distance indicator on the aircraft of Fig. 1.

Referring to the drawings, the system represented in Fig. 1 includes the provision of one or more beacons 1 erected on the ground along a proposed flight route for airplanes which are adapted to receive and retransmit interrogating signals from an airplane as at 2.

Referring now to the circuits on the airplane, as shown in Fig. 2, the elements of the system are seen to comprise a timing circuit 3 which generates, for instance, a 12 megacycle pulse, of the type shown at 4, which is injected into a delay cell 5. The delay cell 5 may be of the type disclosed in the copending application filed by S. H. M. Dodington, Serial No. 551,470, filed August 28, 1944, now patent No. 2,492,794 granted December 27, 1949, which includes a crystal 6 and a movable reflector 7 separated by a suitable liquid 8, all arranged within a container 9. The pulses, when applied to the X-cut crystal 6 which vibrates at, for instance, a frequency of 13 megacycles, being midway between the two extremes at which the delay cell operates, cause an injection of such pulses into the liquid 8 and a reflection thereof from the reflector 7. The original and delayed pulses are applied to an amplifier 10 and thence, in the form of a pair of pulses, as indicated at 11, are fed into a transmitter 12 for conversion into radio frequencies. In due course, these twin pulses are received back from the nearest ground beacon at a receiver 13 and used to modulate an oscillator 14 operating at a given frequency, for example of substantially 14 megacycles. The output of this oscillator 14 also is fed into the delay cell 5, producing a reflection which is amplified in an amplifier 15 and therefrom passed to a mixer circuit 16. A suitable bridge, indicated at 17, is provided for conducting the various pulses to their proper circuit destinations.

This bridge may be for example a bridge of the type disclosed in U. S. Patent No. 2,147,809 or any known form of hybrid coil. This mixer adds the amplitudes of the received signals indicated at 18 to the amplitude 19 coming out of the amplifier 15. The mixer circuit 16 preferably includes, or is preceded by, a suitable clipping circuit to equalize the amplitudes of both signals. If the distance between incoming pulses is exactly equal to the delay caused by the delay cell, a double amplitude pulse will result as shown at 20, and only such a pulse is fed to a distance indicator 21. The distance indicator then reads the time differential between the second transmitted pulse and the second received pulse, a connection being provided from the transmitter to the distance meter for that purpose. The pulses being timed in the distance meter 21 are shown shaded at 11 and 20.

Although, as described, the received pulses are prevented from entering the transmitter because of frequency differences, other means to this end may be used. It is clear that blocking circuits of known type could be used to block the receiver during transmission periods, and unblock the transmitter simultaneously.

It will be seen from the above that a two-pulse system substantially in accordance with the disclosure, permits the airplane or any other transmitter to recognize its own pulse spacing which may be continuously varied as, for instance, between 30 and 150 microseconds in the delay cell 5. The range of 30 to 150 microseconds provides a considerable number of combinations which, if continuously varied, should eliminate practically all interference. In addition, there is, of course, nothing to stop the use of conventional notch-finding and follow-up circuits after the preliminary weeding out of the worst interference in accordance with the above. However, it will be apparent that the two-pulse system described, offers considerable security in itself. Moreover, in each craft means may be provided to vary the delay over some arbitrary range so that further distinction may be thus obtained. The capability of instantly recognizing its own signal on the first interrogation, allows the aircraft to switch from one beacon to another almost instantly as far as the distance indicator itself is concerned. This system also makes it possible that the pulse repetition frequency of the interrogating transmitter ultimately can be lowered considerably below its present figure of 30 cycles.

While we have described above the principles of our invention in connection with specific apparatus, it is to be clearly understood that this description is made only by way of example and not as a limitation on the scope of our invention.

We claim:

1. A system for measuring distance including an interrogating and a responding portion, comprising at the interrogating point a source of pulses, means for variably delaying the pulses of said source, a transmitter for said pulses including means for combining the original and the delayed pulses to produce pairs of pulses connected to said source and said delaying means, a receiver for responding pulses, means for applying said received pulses to said delaying means, means for combining the received pulses of said receiver and the delayed pulses of said delaying means, and a distance meter in operative connection with said transmitter and said receiver; and a responding portion including a receiver and a transmitter for responding to the interrogating pulses.

2. A system according to claim 1, wherein said source comprises an oscillator having a single recurring pulse output.

3. A system according to claim 1 wherein said delaying means comprises a delay cell including a crystal and a reflector, and means for varying the separation between said crystal and said reflector.

4. A system according to claim 1 wherein said combining means comprises a mixer and a clipper circuit, whereby the pulse pairs of the receiver and of the cell are added in amplitude to produce a pulse of increased amplitude pulse if the distance between incoming pulses is exactly equal to the delay caused by the cell.

5. A system according to claim 1 wherein said meter includes means for timing the occurrence of the second of the pair of transmitted and of the pair of received pulses.

6. In a system for measuring distance by interrogation and response, the interrogating portion comprising a source of pulses, means for delaying the pulses of said source, a transmitter for both said pulses connected to said source and said delaying means, a receiver for responding pulses, means for applying said received double pulses to said delaying means, means for combining the double pulse output of said receiver and of said delaying means, and a distance meter in operative connection with said transmitter and said receiver.

7. A system according to claim 6 wherein said source comprises an oscillator having a single recurring pulse output.

8. A system according to claim 6 wherein said delaying means comprises a delay cell including a crystal and a reflector, and means for varying the separation between said crystal and said reflector.

9. A system according to claim 6 wherein said combining means comprises a mixer and a clipper circuit, whereby the pulse pairs of the receiver and of the cell are added in amplitude to produce a pulse of increased amplitude pulse if the distance between incoming pulses is exactly equal to the delay caused by the delay cell.

SVEN H. M. DODINGTON.
GILBERT R. CLARK.

REFERENCES CITED

The following references are of record in the file of this patent:

UNITED STATES PATENTS

| Number | Name | Date |
| --- | --- | --- |
| 2,403,600 | Holmes | July 9, 1946 |
| 2,406,316 | Blumlein | Aug. 27, 1946 |
| 2,407,198 | Wolff | Sept. 3, 1946 |
| 2,419,525 | Alford | Apr. 29, 1947 |